US006698715B2

(12) United States Patent
Smith, Jr. et al.

(10) Patent No.: US 6,698,715 B2
(45) Date of Patent: Mar. 2, 2004

(54) VALVE HAVING CERAMIC COMPONENTS AND ASSOCIATED FABRICATION METHOD

(75) Inventors: James Edwin Smith, Jr., Huntsville, AL (US); George O. Ellis, Bowling Green, KY (US); David Todd Ellis, Bowling Green, KY (US)

(73) Assignee: University of Alabama, Huntsville, AL (US)

( * ) Notice: Subject to any disclaimer, the term of this patent is extended or adjusted under 35 U.S.C. 154(b) by 9 days.

(21) Appl. No.: 09/738,383

(22) Filed: Dec. 15, 2000

(65) Prior Publication Data

US 2001/0025941 A1 Oct. 4, 2001

Related U.S. Application Data

(60) Provisional application No. 60/170,807, filed on Dec. 15, 1999.

(51) Int. Cl.$^7$ ................................................. F16K 5/20
(52) U.S. Cl. ....................................................... 251/174
(58) Field of Search .......................................... 251/174

(56) References Cited

U.S. PATENT DOCUMENTS

| | | | |
|---|---|---|---|
| 3,518,742 A | 7/1970 | Merrill et al. | |
| 3,985,150 A | 10/1976 | Kindersley | |
| 4,033,550 A | * 7/1977 | Wheatley et al. | 251/328 |
| 4,253,992 A | 3/1981 | Soejima et al. | |
| 4,266,566 A | * 5/1981 | Kacal et al. | 251/174 X |
| 4,372,531 A | 2/1983 | Rollins et al. | |
| 4,477,055 A | * 10/1984 | Partridge | 251/174 X |
| 4,735,638 A | 4/1988 | Ciliberti et al. | |
| 4,922,949 A | 5/1990 | Mizukusa et al. | |
| 4,936,546 A | 6/1990 | Berchem | |
| 4,945,945 A | 8/1990 | Schmid | |
| 5,040,566 A | 8/1991 | Orlandi | |
| 5,041,315 A | 8/1991 | Searle et al. | |
| 5,043,117 A | 8/1991 | Adachi et al. | |
| 5,052,349 A | 10/1991 | Buelna | |
| 5,052,363 A | 10/1991 | Stiles | |
| 5,055,435 A | 10/1991 | Hamanaka et al. | |
| 5,106,106 A | 4/1992 | Bruckner et al. | |

(List continued on next page.)

FOREIGN PATENT DOCUMENTS

| | | |
|---|---|---|
| GB | 2 205 631 A | 12/1988 |
| GB | 2 215 437 A | 9/1989 |
| GB | 2 258 290 A | 2/1993 |

*Primary Examiner*—Gene Mancene
*Assistant Examiner*—Eric Keasel
(74) *Attorney, Agent, or Firm*—Alston & Bird LLP

(57) ABSTRACT

A flow-controlling device is provided for controlling the flow of a fluid. The device comprises a housing, a flow-control element disposed within the housing, at least one seat operably engaging the flow-control element, a biasing device operably engaging each seat for urging the seat into sealing engagement with the flow-control element, and an actuating device operably engaging the flow-control element. The seat operably engages the flow-control element and the biasing device operably engages the seat to urge the seat into a sealing engagement with the flow-control element. The flow-control element, the seat, and the biasing device are comprised of a refractory and/or toughened ceramic material that is fully annealed so that porosity in the material is substantially eliminated and such that the material is substantially homogenous. Components fabricated from such a ceramic are generally heat, corrosion, and wear resistant and are capable of substantial elongation without failure. The flexible ceramic allows the fabrication of fluid-contacting, sealing, or other members as unitary structures from the same heat, corrosion, and wear-resistant ceramic material. More specifically, the seat, the flow-control element, the biasing device, or other components may be advantageously fabricated of a flexible ceramic material and, in some cases, as a unitary structure. An associated fabrication method is also provided.

2 Claims, 4 Drawing Sheets

U.S. PATENT DOCUMENTS

| | | |
|---|---|---|
| 5,297,580 A | 3/1994 | Thurman |
| 5,312,804 A | 5/1994 | Petitbon et al. |
| 5,353,832 A | 10/1994 | Berchem |
| 5,503,180 A | 4/1996 | Nimberger |
| 5,566,923 A | 10/1996 | Ennis et al. |
| 5,707,041 A | 1/1998 | Bovee et al. |
| 5,810,041 A | 9/1998 | Garofalo |
| 5,814,262 A | 9/1998 | Ketcham et al. |
| 5,829,735 A | 11/1998 | Ikeda |
| 5,906,354 A * | 5/1999 | Gilbert et al. ............... 251/214 |
| 5,935,533 A | 8/1999 | Kleefisch et al. |
| 5,937,892 A | 8/1999 | Meisner et al. |
| 6,073,648 A | 6/2000 | Watson et al. ............... 137/375 |

\* cited by examiner

VALVE HAVING CERAMIC COMPONENTS AND ASSOCIATED FABRICATION METHOD

CROSS-REFERENCE TO RELATED APPLICATIONS

This application is related to commonly owned copending Provisional Application Ser. No. 60/170,807, filed Dec. 15, 1999, incorporated herein by reference in its entirety, and claims the benefit of its earlier filing date under 35 U.S.C. 119(e).

FIELD OF THE INVENTION

The invention relates to valves used in controlling the flow of fluids in a fluidic system and, more particularly, to a valve and components thereof suitable for use in high temperature, corrosive, abrasive, and other hostile environments.

BACKGROUND OF THE INVENTION

Valves are commonly employed as flow control devices in all types of fluidic systems. These valves may have many different configurations, depending on the particular application, such as a ball valve, a gate valve, a globe valve, a slide valve, a check valve and the like. Such valves typically comprise a housing having a fluid inlet and a fluid outlet, a flow-control element disposed within the housing between the inlet and the outlet, seals engaging the flow-control element to prevent the fluid from flowing between the housing and the flow-control element and/or out of the housing, and an actuating device for moving the flow-control element between an open position, where flow of the fluid between the inlet and the outlet is permitted, and a closed position in which the fluid is not able to flow between the inlet and the outlet. These components of a typical valve are generally comprised of materials appropriate for the particular application. For example, many components for a low pressure cold water valve can be comprised of a polymer material, whereas a higher pressure steam valve may be comprised predominantly of metallic components. However, common valves generally become unsuitable as the temperature and the hostility of the environment increases. For instance, where corrosive and/or abrasive-containing fluids are being handled, commonplace valves may be easily damaged unless special measures are taken in the design of the valve and/or the remainder of the fluidic system to protect the valves. Without costly measures to allow the use of commonplace valves in hostile environments, a serious safety hazard or reliability problem may be created. As a further example, high temperature fluidic processes typically require hot process fluids to be cooled before being pumped or piped to a subsequent location where the fluid may again have to be restored to the proper operating temperature for the process, thereby reducing the efficiency and raising the cost of such an operation. Thus, there exists a need for a valve capable of operating safely, reliably, and economically in high temperature or other hostile environments, such as in fluidic systems where corrosive and/or abrasive-containing fluids are present.

Still further concerns exist with common valves in emergency situations where the temperatures of the fluids to which the valves are exposed are not controllable. For example, in the event of a fire at a petrochemical refinery, excessive temperatures may cause common valves to fail, thereby allowing storage tanks to deleteriously feed the fire with catastrophic results. At excessively high temperatures, seals internal to the valve may fail, the seat and/or the flow-control element may warp, and/or any springs present within the valve may lose their spring constants and thereby allow separation of the components biased by the spring. Thus, the endeavor to develop a valve suitable for use at excessively high temperatures has led to the proposal that ceramic materials could be used for valve fabrication. See, for example, U.S. Pat. No. 4,372,531 to Rollins et al.

Ceramics are generally recognized as a class of refractory materials suitable for use in high temperature applications and in corrosive or abrasive environments. However, most ceramics are typically deficient in their ability to withstand tensile stresses without failure. Therefore, where components are fabricated from ceramic materials, these components are configured and utilized such that they are exposed mainly to compressive stresses and little or no tensile stresses. However, many components of a valve may experience significant tensile stresses due, at least in part, to shear stresses imparted by the fluid and possibly the configuration and utilization of the component. Thus, where ceramic has been utilized in the fabrication of valve components, additional measures must often be taken to assure that the valve functions as intended without the ceramic components failing. Generally, these additional measures comprise supplemental components fabricated of a material more appropriate for withstanding tensile stresses, but typically not as able to withstand excessively high temperatures as the ceramic material. For instance, a TEFLON® seal may be placed between the flow-control element and the seat. This results in a valve where the critical and/or fluid-contacting components are not entirely able to withstand excessively high temperature or other hostile environments to which the valve may be exposed. Thus, there exists a further need for a valve capable of withstanding high temperature or other hostile environments, wherein the critical and/or fluid-contacting components are fabricated of refractory materials such as a ceramic, preferably with as few seams as possible therebetween.

Thus, a continued need exists for a practical valve capable of withstanding excessively high temperatures or other hostile environments, wherein the valve is relatively simple to produce, reliable, and cost effective.

SUMMARY OF THE INVENTION

The invention comprises a flow-controlling device for controlling the flow of a fluid, a valve, capable of withstanding extreme temperatures of over 400 degrees Centigrade and also capable of withstanding abrasive and corrosive environments. All of the urging and sealing components in the valve, including the flow-control element, the seat sealingly engaging the flow-control element, and the means for urging the seat into sealing contact with the flow-control element, are prepared from highly stable refractory and/or toughened ceramic materials that are capable of withstanding abrasives, corrosives, and extreme temperatures. No resilient materials including metal, rubber and rubber-like polymers, TEFLON®, or o-rings are included in the valve. The valve components are simple in design and can be retrofitted into an existing standard valve design, including, but not limited to, poppet and ball valves. These valves can withstand process fluids at over 500 degrees Centigrade, at over 640 degrees Centigrade, and at red hot conditions of 1000 degrees Centigrade or more over extended periods of time comparable to similar designs at current practical limits of about 200 to 400 degrees Centigrade.

Certain refractory and/or toughened ceramics materials, commonly referred to as advanced ceramics, exhibit useful resistance to tensile stress when the material is heat treated in a certain manner. More particularly, a yttria-stabilized zirconia or other comparable ceramic material that is fully annealed so that porosity in the material is minimized and so that the material is substantially homogenous, is capable of substantial elongation and compression without failure. This flexible ceramic allows the fabrication of fluid-contacting, sealing, or other members from the same heat and wear-resistant materials.

The above and other needs are met by the invention which, in one embodiment, provides a flow-controlling device for controlling the flow of a fluid prepared in accordance with the invention. The device comprises a housing, a flow-control element disposed within the housing, at least one seat operably engaging the flow-control element, and a biasing device operably engaging each seat for urging the seat into sealing engagement with the flow-control element. Each of the flow-control element, the seat, and the biasing device are comprised of refractory and/or toughened materials including, for example, an advanced ceramic. More specifically, the seat, the flow-control element, the biasing device, or other components may be advantageously fabricated of a flexible ceramic material. In some embodiments, the seat and the biasing device, including a spring, are prepared as a unitary structure from a toughened ceramic, including, for example, yttria-stabilized zirconia and others. The flow-control element can be prepared from a harder ceramic, if desired.

The flow-controlling device of the invention further comprises an actuating device operably engaging the flow-control element. A housing for the device generally defines an inlet adapted to receive the fluid and an outlet adapted to dispense the fluid. The flow-control element is disposed between the inlet and the outlet and is adapted to control the flow of the fluid therethrough. The seat operably engages the flow-control element and is adapted to prevent the fluid from flowing between the housing and the flow-control element.

In one advantageous embodiment of the invention, the seat is further adapted to channel the fluid between the flow-control element and at least one of the inlet and the outlet. The biasing device operably engages the seat and urges the seat into a sealing engagement with the flow-control element. The actuating device actuates the flow-control element, with respect to the seat, between a position in which flow-control element allows the fluid to flow between the inlet and the outlet and a position in which fluid-control element does not allow the fluid between the inlet and the outlet. If desired, the actuating device is also be prepared from the same types of materials as the flow-controlling element, the seat, and the means for urging the seat into sealing engagment with the flow-control element.

In an alternative embodiment, the sealing device may further comprise a shield operably engaging the seat and adapted to channel the fluid therethrough such that the fluid does not contact the biasing device. This embodiment can be useful if it is desired to preclude contact between abrasive particles and a helical coil spring prepared from ceramic materials. However, it normally should not be necessary to isolate the spring from the abrasives that may be contained in a process fluid. Of course, if the valve were operated at lower temperatures, then a spring made from materials meeting the temperature requirements could be substituted. If desired, the seat, the biasing device, and the shield are integrally fabricated from a unitary piece of a ceramic material.

The invention includes a method of fabricating a sealing device for interacting with a flow-control element of a flow-controlling device for controlling the flow of a fluid. First, a bore is formed in a cylinder of a refractory material such that the bore defines an axis and is adapted to cooperate with the flow-control element to control the flow of a fluid through the bore. In some instances, the sealing device may be fabricated from a tubular member having appropriate inner and outer diameters. A groove is then formed about the perimeter of the cylinder such that the groove is concentric with the bore. A seating surface is then formed in the cylinder adjacent to the groove and generally perpendicular to the axis of the bore. The groove is disposed proximally to the seating surface so as to cause the portion of the seating surface about the perimeter of the cylinder to be flexible. A channel is then formed in the cylinder opposing the seating surface, wherein the channel extends into the cylinder concentrically with the bore, and thereby forms a spring blank outward of the channel and a spring shield inward of the channel such that the spring shield houses the bore. A spiral groove is then formed in the spring blank so as to fabricate a biasing device. In this manner, the sealing device is formed as an integral structure from a unitary piece of a refractory material, such as a ceramic, where the biasing device is capable of urging the seat into sealing engagement with the flow-control element and the spring shield channels the fluid flow such that contact of the fluid with the biasing device and/or the housing is avoided.

Still another advantageous aspect of the invention comprises a device for sealing an actuator that is operably connected to a flow-control element disposed within a casing of a flow-controlling device for controlling the flow of a fluid. Generally, the device comprises a housing adapted to engage the casing so as to surround the actuator, a compliant packing adapted to be disposed about the actuator, an end cap operably engaging the housing, and a biasing device disposed within the housing intermediate the end cap and the packing. The housing has a proximal end adjacent to the flow-control element and an opposing threaded distal end. The packing is disposed about the actuator at the proximal end of the housing adjacent to the flow-control element to form a seal between the actuator and the housing. The end cap is secured to the threaded end of the housing and is generally adapted to allow the actuator to pass therethrough. The biasing device is configured such that a substantially uniform compressive force is applied to the packing about the actuator when the biasing device interacts with the end cap and the packing. The packing is thereby compressed between the housing and the actuator to form a seal therebetween. The packing can be comprised of, for example, a graphite-impregnated foil material or a graphite-impregnated ceramic fiber. The actuator and biasing device can be prepared from ceramic materials of the same type as is used in the other components, if desired.

In one embodiment, the invention comprises a ball valve for controlling the flow of a fluid. Generally, the ball valve comprises a housing, a valve ball disposed within the housing, at least two seats operably engaging the valve ball, a biasing device operably engaging each seat, optionally a shield operably engaging each seat, and a valve stem operably engaging the valve ball. The housing defines an inlet adapted to receive the fluid and an outlet adapted to dispense the fluid, wherein the valve ball is disposed between the inlet and the outlet and defines a bore capable of establishing communication between the inlet and the outlet. The seat is adapted to prevent the fluid from flowing between the housing and the valve ball, while the biasing device operably engages the seat and urges the seat into sealing engagement with the valve ball. The shield extends from the valve ball to at least one of the inlet and the outlet and is adapted to channel the fluid therebetween. The valve stem operably engages the valve ball and is capable of actuating the valve ball between a position in which the fluid is capable of flowing between the inlet and the outlet through the bore in the valve ball and a position in which the fluid is not capable of flowing between the inlet and the outlet through the bore in the valve ball. The valve ball, the seat, the biasing device, and the shield, if included, are comprised of a refractory and/or toughened material such as, for example, a ceramic. In one particularly advantageous embodiment, the seat, the biasing device, and the shield, if present, are an integral structure fabricated from a unitary piece of a ceramic material such as, for example, yttria-stabilized zirconia.

Thus, the invention provides fluid-contacting and other components of a valve that are sufficiently flexible and generally heat and wear-resistant and can withstand significant applied tensile stresses. Certain components may be fabricated as unitary structures, thereby reducing the number of components required for the valve assembly. Embodiments of the invention therefore provide a valve capable of operating in high temperature and other hostile environments in a relatively safe and reliable manner, while the characteristics of the ceramic material facilitate cost-effective fabrication techniques. It will be recognized, therefore, that the invention facilitates the achievement of a number of distinct advantages over prior art valves used in high temperature or other hostile environments.

BRIEF DESCRIPTION OF THE DRAWINGS

Some of the advantages of the invention having been stated, others will appear as the description proceeds, when considered in conjunction with the accompanying drawings, which are not necessarily drawn to scale, in which.

DETAILED DESCRIPTION OF THE INVENTION

The invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
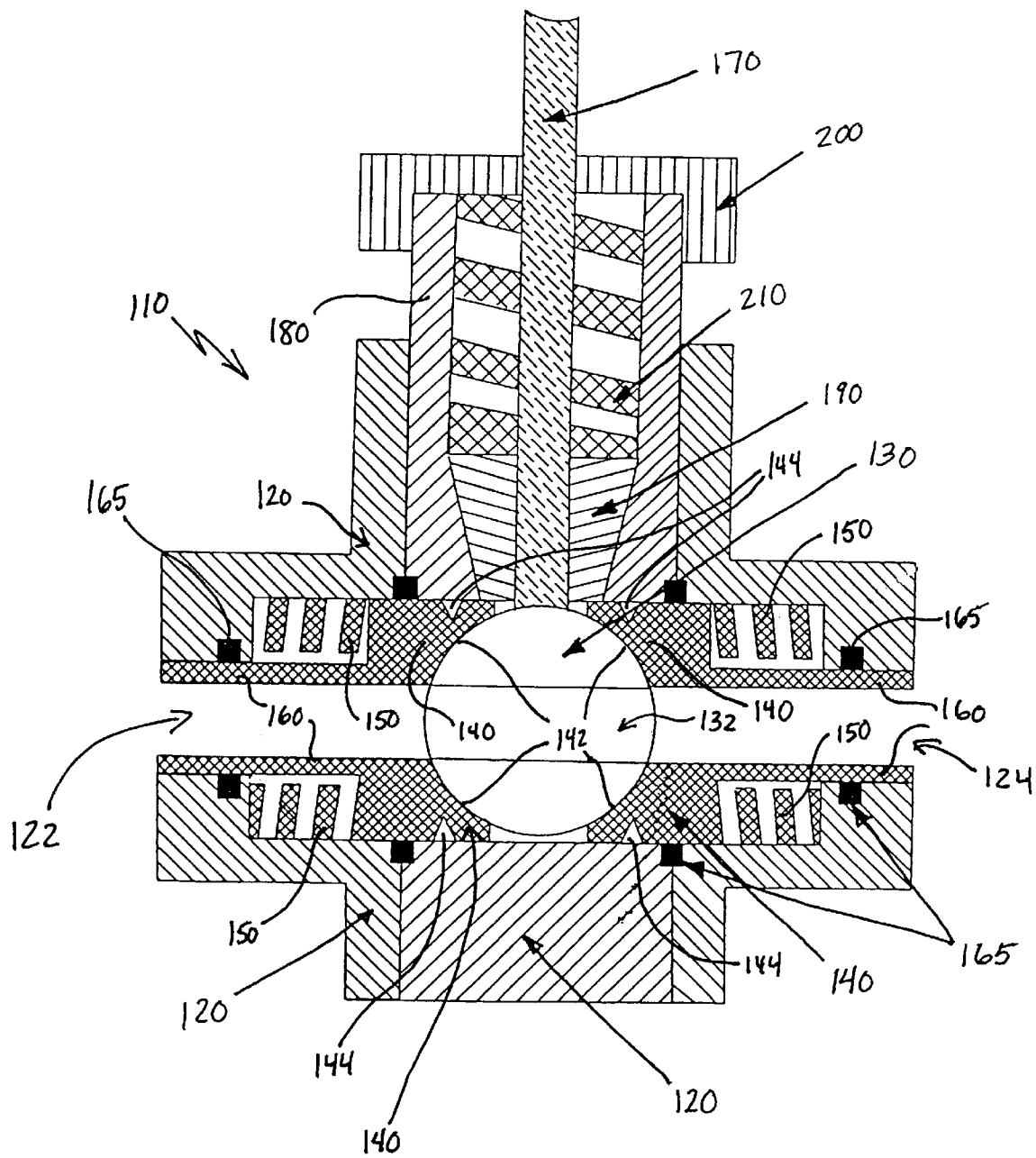
FIG. 1 is a cross-sectional view of a ball valve having ceramic components according to one embodiment of the invention.

FIG. 1 discloses an embodiment of a valve according to one embodiment of the invention, more particularly a ball valve, indicated generally by the numeral 110. The ball valve 110 generally comprises a valve housing 120, a valve ball 130, a valve seat 140, a biasing device 150 for biasing the seat 140, a spring shield 160, a valve stem 170, a valve stem housing 180, valve stem packing 190, an end cap 200, and a packing spring 210. Note that, for the sake of illustration, a ball valve is shown and described herein. It is understood that this illustration of a ball valve is for the sake of description only and the invention is applicable to many different valve configurations as will be apparent from the following description. Thus, embodiments of the invention include any valves where the seat, the flow-control element, or other components may be fabricated from a refractory material such as a ceramic in accordance with the spirit and scope of the invention.

The valve body 120 of a ball valve 110 generally defines an inlet 122 adapted to receive a fluid and an outlet 124 adapted to dispense the fluid therefrom. The valve ball 130 is disposed within the valve body 120 generally between the inlet 122 and the outlet 124. The valve ball 130 defines a bore 132 therethrough, wherein the bore 132 cooperates with the inlet 122 and the outlet 124 to permit the flow of the fluid therethrough when the valve ball 130 is situated in an open position. Generally, the valve ball 130 is rotatable within the housing 120 such that the orientation of the bore 132 may be changed from an open position in which the fluid is able to flow to a closed position in which the bore 132 is no longer in communication with the inlet 122 and the outlet 124 and the fluid is not able to flow. This general mechanism governs the operation of the illustrated ball valve 110. The valve ball 130 may be comprised of many different ceramics such as, for example, high purity alumina, stabilized zirconia, silicon nitride, mullite, or the like.

Operably engaging the valve ball 130 is at least one valve seat 140, wherein two separate valve seats 140 are shown for this advantageous embodiment of a ball valve 110, one to form a seal with the valve ball 130 on the inlet 122 side thereof and the other to form a seal with the valve ball 130 on the outlet 124 side thereof. The valve seats 140 generally form a seal between the valve ball 130 and the housing 120 such that fluid entering the inlet 122 does not flow out of the housing 120 or around the valve ball 130 between the valve ball 130 and the housing 120. In order to maintain the sealing engagement between the seat 140 and the valve ball 130, a biasing device 150 such as, for example, a coil spring, is provided to exert a compressive force on the seat 140 to urge the seat 140 into a sealing engagement with the valve ball 130. In some instances, a spring shield 160 is further provided, wherein the spring shield 160 extends between the seat 140 and the inlet 122 and/or the outlet 124 inwardly of the biasing device 150 such that the spring shield 160 forms a channel for directing the fluid flow between the valve ball 130 and the inlet 122 and/or outlet 124. In one particularly advantageous embodiment, the valve seat 140, the biasing device 150, and the spring shield 160 form an integral structure fabricated from a unitary piece of a refractory material such as, for example, a ceramic. Note that the spring shield 160 may not be necessary for the practice of the invention, but is particularly advantageous where the fluid flow being controlled by the valve 110 contains particulate matter which could cause damage to the biasing device 150. Since these components are typically exposed to the high temperatures and/or other hostile environments created by the fluid flowing therethrough, the valve seat 140, the biasing device 150, and the spring shield 160 may be comprised of, for example, magnesium-stabilized zirconia, yttria-stabilized zirconia, some high purity aluminas, silicon nitride, or the like. Further note that the components as described herein may be selectively comprised of a ceramic according to the features desired of the valve 110. For instance, a valve 110 for handling an abrasive fluid media may have sufficient performance characteristics where only the valve ball 130 is comprised of a ceramic such that the less expensive and more replaceable seats 140 would tend to wear before the more critical and expensive valve ball 130. Thus, the materials from which, for instance, the valve ball 130, the valve seats 140, the biasing device 150, and the spring shield 160 are formed may be selected to provide the desired wear or other performance characteristics. In some cases, for example, the valve ball 130 may be comprised of a ceramic different from the ceramic from which the seat 140 is comprised.

Besides the advantages provided by the use of ceramic materials in the fabrication of valve components, the processing of the ceramic material itself has been found to be particularly advantageous. Ceramic materials such as, for example, some high purity aluminas, magnesium-stabilized zirconia, yttria-stabilized zirconia, silicon nitride and the like have been found to withstand tensile stresses when fully annealed to minimize porosity and to produce a substantially homogeneous material. Such an annealing process may comprise, for example, gradually reducing the post-formation temperature at a controlled rate over an extended period of time. In one particular example, yttria-stabilized zirconia was found to exhibit desirable material properties when the material was reduced from a formation temperature of about 2200° C. to room temperature over a time period of about three days in an approximately linear manner. While particular examples are described herein, it is understood that many different ceramics may exhibit similar ability to withstand tensile stresses when annealed in a similar manner. The parameters of the annealing process also may vary greatly and yet still produce a substantially homogeneous ceramic with minimal porosity. Further, other factors such as, for example, the thickness of the material may also affect the mechanical properties exhibited by components eventually fabricated from the fully annealed ceramic. Thus, it is understood that embodiments of the invention may include any ceramic that is fully annealed to obtain substantial homogeneity and minimal porosity in accordance with the spirit and scope of the invention, wherein the specific mechanical properties of components fabricated from the ceramic may also be affected by additional parameters such as, for example, the thickness of the material.

Where necessary, additional seals 165 may be established between the valve body 120 and the valve seats 140 and/or the spring shields 160. Since the seals 165 are isolated from the fluid by the valve seat 140/the spring shield 160 components, the seals 165 may be comprised of a flexible, heat resistant material such as, for example, a graphite-impregnated foil, such as GRAFOIL®, or a graphite-impregnated ceramic fiber. As shown, the seals 165 seal outer surfaces of the valve seat 140 and the spring shield 160 to the valve body 120 and help to prevent foreign materials from coming into contact with the biasing device 150.

With the configuration of a ball valve 110 as shown, the valve ball 130 typically has an actuating device 170 operably engaged therewith for moving the valve ball 130 between an open position and a closed position with respect to the flow of the fluid between the inlet 122 and the outlet 124. The actuating device 170 may comprise, for example, a valve stem extending from the valve ball 130, generally perpendicular to the bore 132. Generally, the attachment of the valve stem 170 to the valve ball 130 renders some areas of the valve seat 140 adjacent to the valve stem 170 generally unsupported by the valve body 120 with respect to maintaining a sealing engagement between the valve seat 140 and the valve ball 130. Thus, a ball valve 110 generally requires separate provisions for sealing about the valve stem 170, wherein these provisions must take into account that the valve stem 170 is required to rotate about its longitudinal axis in order to provide the necessary actuation of the valve ball 130. Therefore, a ball valve 110 generally includes a valve stem housing 180 operably connected to the valve body 120 and extending therefrom. The valve stem housing 180 may be welded to, threaded into, or otherwise securely attached to the valve body 120 such that it surrounds the valve stem 170. Since the area about the valve stem adjacent to the valve ball 130 may be in communication with the fluid flowing through the valve 110 due to, for example, leakage between the valve ball 130 and the valve seat 140, provisions must also be made for the components within the valve stem housing 180 to be resistant to the same high temperatures and/or the factors producing the hostile environment that is experienced by the valve ball 130. With ball valves in general, a valve stem packing 190 is typically inserted into the valve stem housing 180 about the valve stem 170 and then compressed such that the packing 190 forms a seal between the valve stem housing 180 and the valve stem 170. However, most packings 190 will tend to wear and/or become increasingly compressed as the valve 110 is used. Thus, according to one embodiment of the invention, the valve stem housing 180 houses a packing 190 disposed about the valve stem 170 adjacent to the valve ball 130, wherein the packing 190 may be comprised of, for example, a graphite-impregnated foil material or a graphite-impregnated ceramic fiber. Sealing the end of the valve stem housing 180 is an end cap 200, also called a packing nut, that is generally operably connected to the end of the valve stem housing 180 by a threaded connection, wherein the end cap 200 permits the valve stem 170 to pass therethrough. In order to maintain the compressive force on the packing 190 to provide optimal sealing between the valve stem 170 and the valve stem housing 180, a packing spring 210 is disposed between the end cap 200 and the packing 190 within the valve stem housing 180. The ends of the packing spring 210 may be configured such that the spring 210 engages both the end cap 200 and the packing 190, with substantially planar faces, such that a uniform compressive force is maintained on the packing 190 about the valve stem 170. In a particularly advantageous embodiment of the invention, at least the packing spring 210, and possibly the valve stem 170, are comprised of a refractory material such as, for example, a ceramic that is fully annealed to minimize porosity as herein described.

Figure 2:
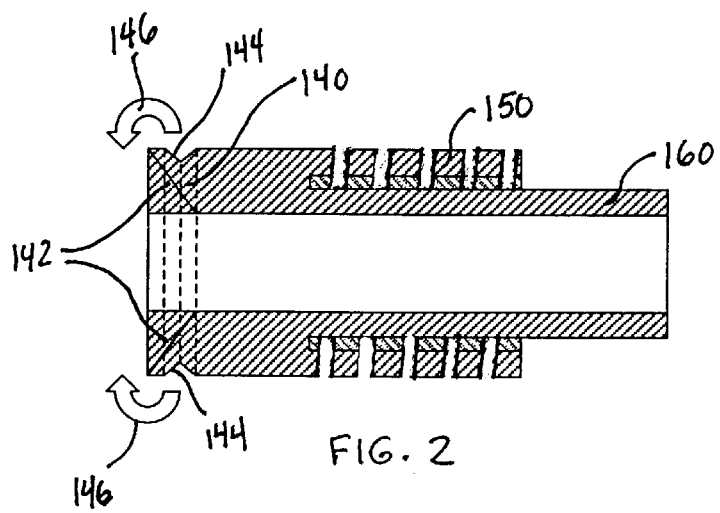
FIG. 2 is a cross-sectional view of a valve seat having an integral spring and spring guard in accordance with one embodiment of the invention.

FIGS. 1 and 2 show embodiments of a valve seat 140 having an integral biasing device 150 and spring shield 160. As shown, the seating surface 142 may have different configurations in order to engage a valve ball 130 in different manners or in order to engage different configurations of a valve ball 130. The groove 144 about the perimeter of the valve seat 140 serves to provide a reduced thickness section valve seat 140 about the perimeter of the seating surface 142. This reduced thickness section about the perimeter of the valve seat 140 allows these portions of the seating surface 142 to be flexible relative to the remainder of the valve seat 140. In some instances, the groove 144 allows inherent stresses in the valve seat 140 to deform the reduced thickness sections such that an asymmetric seating surface 142 results as indicated by the directional arrows 146. An asymmetric seating surface 142 may result, for example, from a conical valve seat 140 being reshaped into one having a surface defined by a parabolic function. The asymmetrical seating surface 142, along with the flexibility of the ceramic material from which the valve seat 140 is comprised, provides a more resilient seat 140 for engaging the valve ball 130. Various forms and shapes of valve seats 140 are further shown in FIGS. 4A and 4B (with the biasing device omitted). It is understood that the configurations of the valve seats 140 having a groove 144 for producing an asymmetrical seating surface 142 as presented herein are merely examples of possible configurations for valve seats 140 consistent with the spirit and scope of the invention. By forming the biasing device 150 and the spring shield 160 integrally with the valve seat 140, these components may be formed of the same heterogeneous material without seams which may result in fluid leaks and which may require additional sealing provisions at the interfaces thereof. Note that various combinations of the seat 140, the biasing device 150, and the spring shield 160 may be fabricated as integral structures according to the invention and the requirements of a particular application thereof. For example, the seat 140 and the spring shield 160 may be fabricated from a ceramic material as an integral structure while a metallic material is used to fabricate the biasing device 150. However, fewer components and unitary construction of selected combinations of components may reduce the fabrication costs of the valve 110 and promote a more reliable operational fluidic system.

Figure 4A:
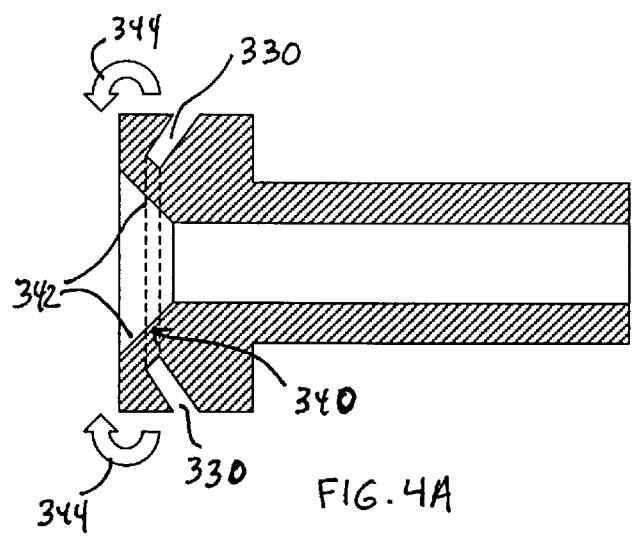
FIGS. 4A and 4B are cross-sectional views of valve seats according to alternate embodiments of the invention.
Figure 4B:
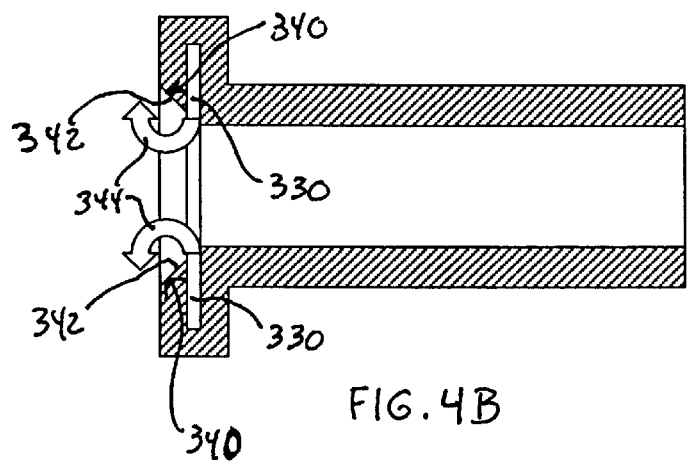

FIG. 3 discloses a sequence of a cross-sectional views depicting a method of fabricating a sealing device for interacting with a flow-control element of a flow-controlling device according to one embodiment of the invention. As shown in FIG. 3A, a bore 320 is first formed in a cylinder 310 of a refractory material such as, for example, a ceramic, wherein the bore 320 defines an axis that is typically concentric with the axis of the cylinder 310. A groove 330 is then formed about the perimeter of the cylinder 310 such that the groove 330 is concentric with the bore 320, as shown in FIG. 3B. A valve seat 340 having a seating surface 342 is then formed in the cylinder 310 adjacent to the groove 330, wherein the seating surface 342 is generally perpendicular to the axis of the bore 320 as shown in FIGS. 3C and 3D. Generally, the groove 330 is disposed proximally to the seating surface 342 so as to cause the portion of the seating surface 342 about the perimeter of the cylinder 310 to be flexible. Stresses inherent in the cylinder 310 about the seating surface 342 and the groove 330 causes the portion of the seating surface 342 about the perimeter of the cylinder 310 to be deformed and to provide an asymmetrical seating surface 342 as indicated by the directional arrows 344. As further shown in FIGS. 3C and 3D, the valve seat 340 may be formed in different configurations to interact with the valve ball 350 in different manners depending on the characteristics of the fluid flowing through the valve or to correspond to different configurations of the valve ball 350. As shown in FIGS. 4A and 4B, the configuration of the groove 330 in relation to the valve seat 340 may vary considerably depending upon the characteristics of the seating surface 342 required in the particular application.

Figure 3A:
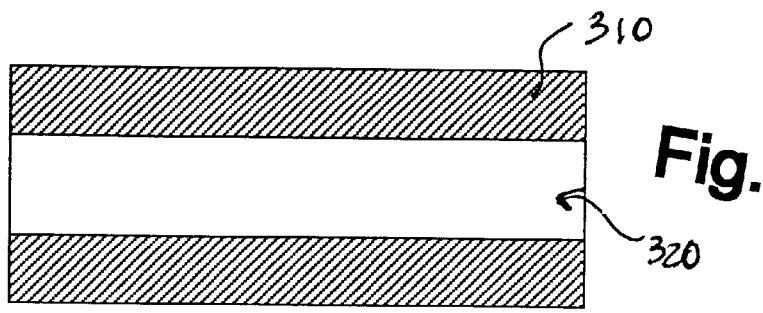
FIGS. 3A–3G illustrate a sequence of cross-sectional views of a method of fabricating a valve seat having an integral spring and spring guard in accordance with one embodiment of the invention.
Figure 3B:
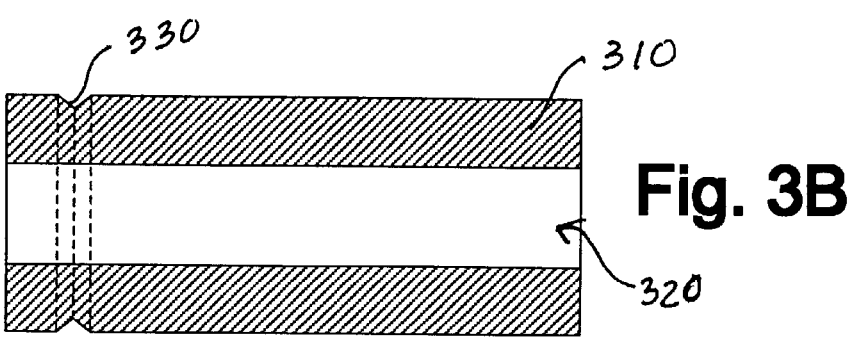
Figure 3C:
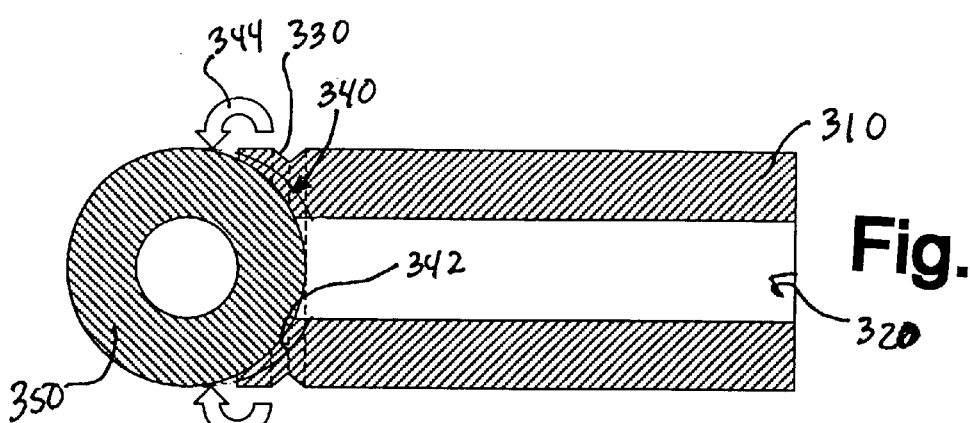
Figure 3D:
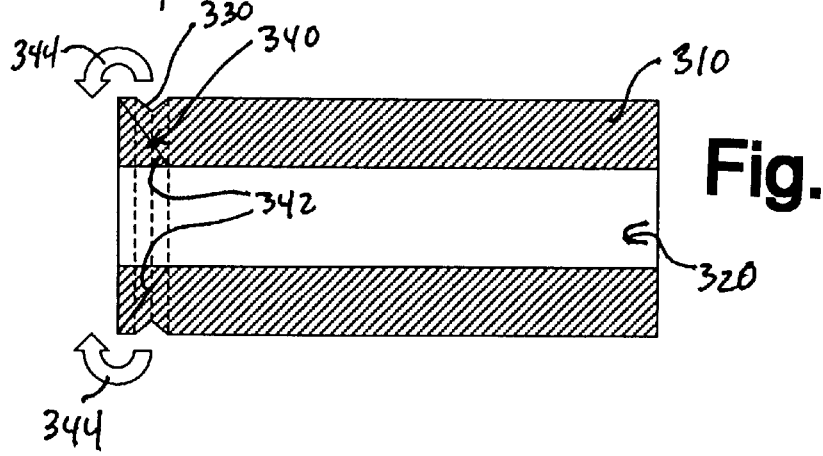
Figure 3E:
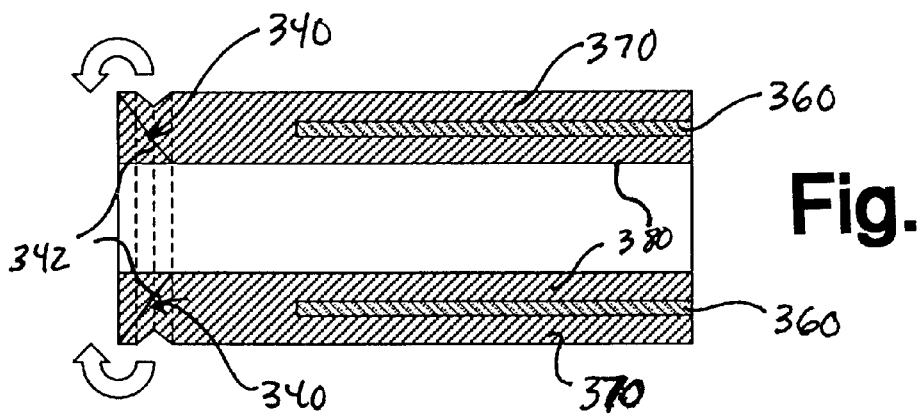
Figure 3F:
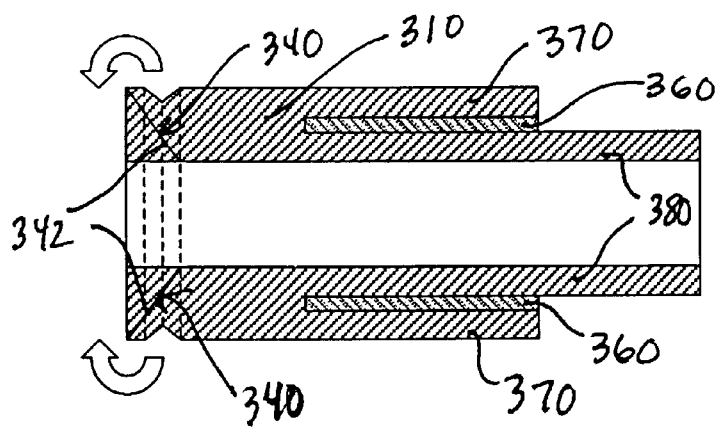
Figure 3G:
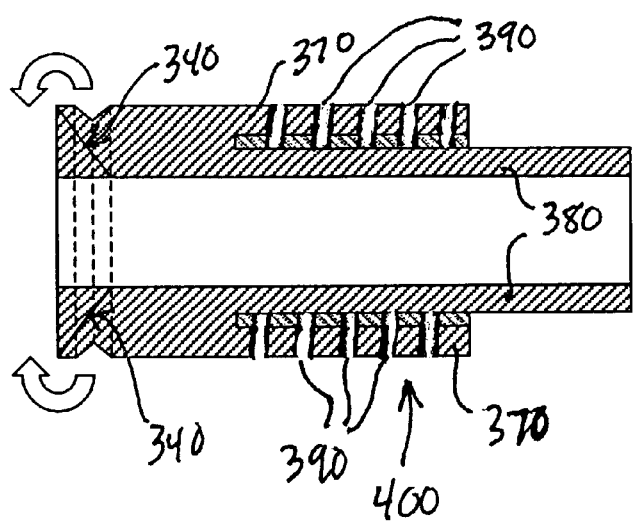

Following the formation of the valve seat 340, a channel 360 is formed in the cylinder opposing the seating surface 342 as shown in FIG. 3E. This results in the formation of a spring blank 370 outward of the channel 360 and a spring shield 380 inward of the channel 360. As shown in FIG. 3F, the spring blank 370 may be reduced in length, in some instances, to compensate for the thickness of the valve housing into which the cylinder 310 is to be inserted. As shown in FIG. 3G, a spiral groove 390 is then formed in the spring blank 370 so as to fabricate a biasing device 400 such as, for example, a coil spring. In this manner, a valve seat 340 is formed integrally with a biasing device 400 and a spring shield 380.

Thus, embodiments of the invention are facilitated by the use of a flexible refractory material such as, for example, a ceramic that is fully annealed to minimize porosity and maximize homogeneity. In a particularly advantageous embodiment, the components described as being fabricatable from a refractory material are comprised of a ceramic such as, for example, yttria-stabilized zirconia that is fully annealed to substantially eliminate porosity and to produce a substantially homogeneous material, wherein the resulting material is capable of substantial elongation without failure. The characteristics of the fully annealed ceramic materials further facilitate the construction of valve components that are critical to the operation of the valve and/or are required to contact the fluid producing the hostile environment. These ceramic materials are generally capable of withstanding the extreme temperatures, corrosives, abrasives, and/or other hostile conditions created by the fluid flowing through the valve. Ease of fabrication of the valve components from the ceramic material facilitates a reduction in the number of separate components comprising the valve and allows for construction techniques resulting in unitary construction of single components or combinations of selected components, which may reduce the costs of valve production as well as possibly increasing the safety and reliability thereof. A valve having ceramic components according to embodiments of the invention therefore provides a relatively safe, reliable, and cost-efficient valve suitable for use in high temperature applications or other hostile environments caused by, for example, corrosive or abrasive fluid media for which common valves are unsuited.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ball valve for controlling the flow of a fluid and for operation at temperatures exceeding 400° C., said ball valve comprising:

a housing defining an inlet adapted to receive the fluid and an outlet adapted to dispense the fluid;

a valve ball disposed within the housing between the inlet and the outlet and defining a bore capable of establishing communication between the inlet and the outlet, the valve ball being comprised of a refractory and/or toughened ceramic material;

at least two seats operably engaging the valve ball, each seat being adapted to prevent the fluid from flowing between the housing and the valve ball;

at least two biasing devices respectively urging the seats into engagement with the valve ball;

a shield arranged in the housing for preventing fluid flowing through the ball valve from contacting one of the biasing devices; and a valve stem operably engaging the valve ball, the valve stem capable of actuating the valve ball between a position in which the fluid is capable of flowing between the inlet and the outlet through the bore in the valve ball and a position in which the fluid is not capable of flowing between the inlet and the outlet through the bore in the valve ball;

wherein the shield, said one of the biasing devices, and one of the seats are all formed integrally as a single body of refractory and/or toughened ceramic material.

2. The ball valve of claim 1 further comprising a second shield arranged in the housing for preventing fluid from contacting the other biasing device, and wherein the second shield, the other biasing device, and the other seat are formed integrally as a single body of refractory and/or toughened ceramic material.

* * * * *